E. H. TRUMP.
PROCESS FOR MAKING PNEUMATIC TIRE CASINGS.
APPLICATION FILED MAR. 26, 1918. RENEWED NOV. 7, 1918.

1,308,379.

Patented July 1, 1919.
2 SHEETS—SHEET 1.

Inventor
Elno H. Trump,
By C. E. Humphrey
Attorney

UNITED STATES PATENT OFFICE.

ELNO H. TRUMP, OF AKRON, OHIO.

PROCESS FOR MAKING PNEUMATIC-TIRE CASINGS.

1,308,379.     Specification of Letters Patent.     Patented July 1, 1919.

Application filed March 26, 1918, Serial No. 224,725. Renewed November 7, 1918. Serial No. 261,585.

*To all whom it may concern:*

Be it known that I, ELNO H. TRUMP, a citizen of the United States, residing at Akron, in the county of Summit and State of Ohio, have invented new and useful Improvements in Processes for Making Pneumatic-Tire Casings, of which the following is a specification.

This invention has relation to improvements in processes of making pneumatic tire casings and the object of the invention is to provide a process by which separate halves of the tread may be previously shaped and expanded by a partial cure in a half mold member the two members forming a complete mold when the members are united and in which is afterward placed a tire building core on which has been built up the fabric carcass of the casing. It is contemplated that the tread and parts of the side faces of the core will be provided with a shallow circumferential groove or channel in which is placed an inflatable air bag which may be blown up when the core with the carcass thereon is placed within the assembled mold members so as to force the peripheral face of the carcass against the inner faces of the tread forming members to cause it to unite therewith during vulcanization. Another feature of the invention is to provide means for preventing the adherence of the inner faces of the tread members with the outer face of the former during the preliminary expansion of the tread members within the permanent mold members. In carrying out my improved process I make use of certain mechanical instrumentalities a preferred form of which is shown in the accompanying drawings wherein similar reference numerals indicate like parts in the different figures.

Figure 1:
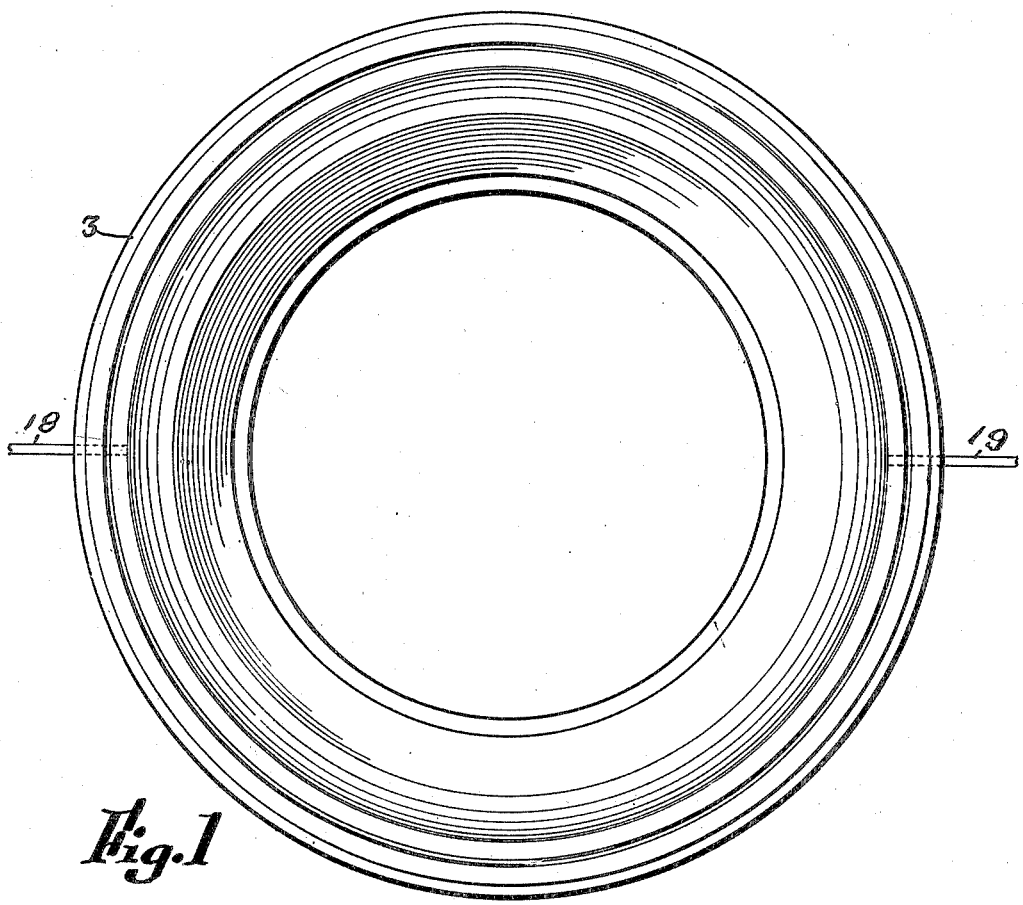
Figure 1 is a plan view of a mold for use in connection with this process.
Figure 2:
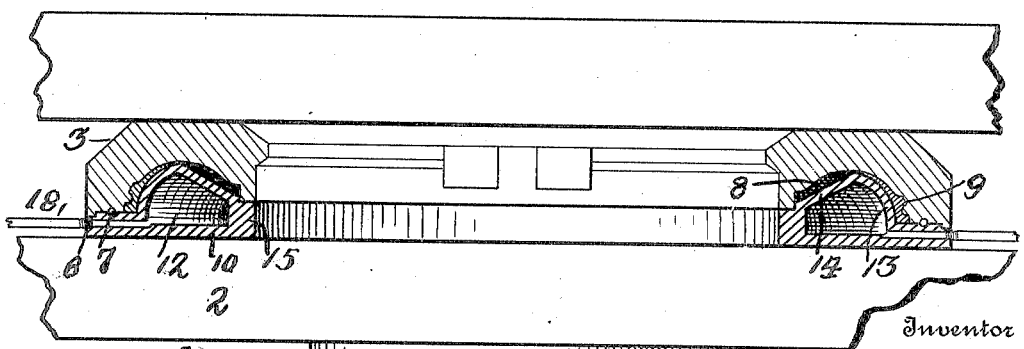
Fig. 2 is a vertical cross sectional view of the device shown in Fig. 1.
Figure 3:
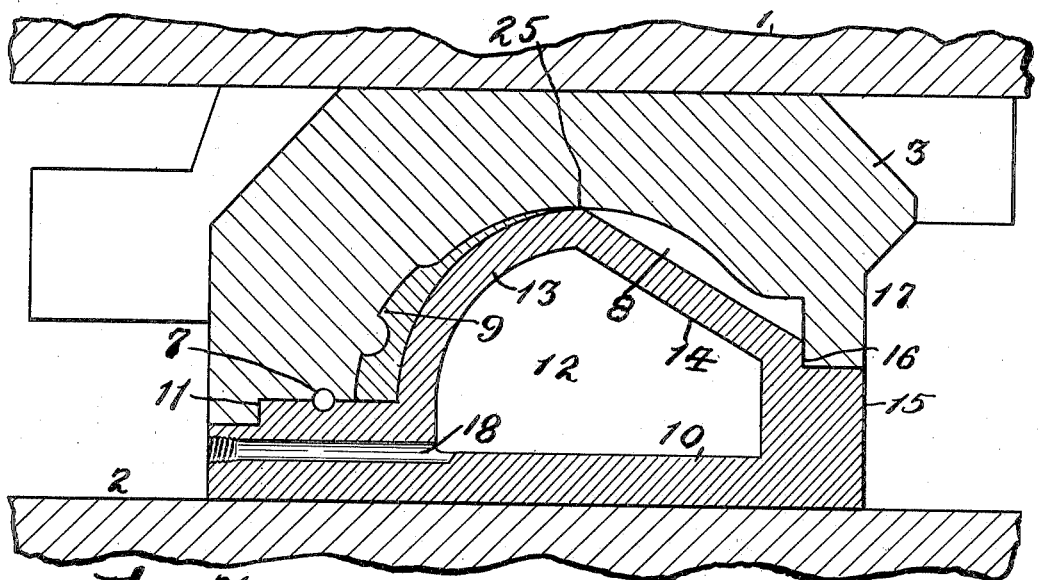
Fig. 3 is a view similar to Fig. 2 enlarged.
Figure 4:
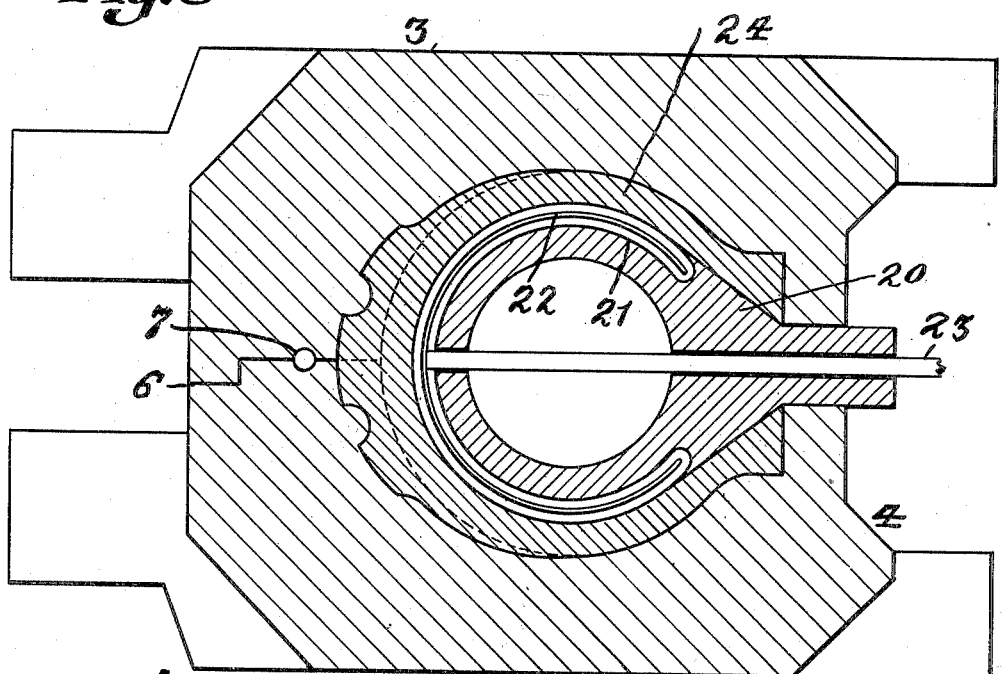
Fig. 4 is a view similar to Fig. 3 with the two mold members united and inclosing a core carrying a carcass and the two tread forming members positioned in the mold cavity.

The mechanical instrumentalities employed in carrying out this process comprise a press embodying an upper platen 1 and a plunger head 2. Means ordinarily employed and common to the art are used for heating the platen 1 for a purpose to be later described. It is contemplated that the tire casing will be formed by a pair of mold members 3 and 4 constructed with the usual mold cavities and with interlocking portions at 6 and with coöperating overflow openings 7.

The tread of the tire is formed separately in two halves divided circumferentially and as the two halves are similar they are each formed in one of the mold members. Each mold member contains the usual mold cavity 8 the configuration of which is such as is desired to impart to the finished tire and if desired the outer or tread portions may be formed with irregularities 9 to form nonskid projections or depressions in the peripheral face of the finished tire. Adapted to coöperate successively with each mold member is a former the function of which is to shape the inner faces of the two half tread members and of proper contour to fit the tread portion of the fabric carcass when the latter is expanded within the mold. The former comprises a ring member 10 provided with a groove or shoulder 11 arranged to coöperate with the shouldered portion of each mold member and hold the parts in position. Formed integrally with the ring 10 is an annular hollow tube 12 comprising a curved wall 13 and a comparatively straight wall 14 which unites with the annular rib 15 forming a part of the ring 10. The rib 15 is provided with a shoulder 16 arranged to coöperate with an annular flange 17 on each mold member so that the two members are held from lateral movement during the forming operation. Communicating with the interior of the tube 12 are inlet and outlet pipes 18 and 19 respectively for a purpose to be later described. The outer face of the curved wall 13 of the former 12 is formed with exactly the same curvature and contour as it is desired to give to the inner face of the tread members.

The carcass of the tire casing is built up on a core 20 provided on its peripheral face with a shallow groove 21 in which is placed an inflatable air bag 22 which is inflated through the medium of an inflating tube 23 extending inwardly through the flange portion of the core 20. It will be obvious, of course, that the core 20 may be made segmental and the various segment-shaped segments united by any of the approved methods now in common use. The fabric carcass 24 is built up on the core in the usual manner but as the peculiar construction of the carcass forms no part of this invention further description of the same is believed to be unnecessary.

The tread strip is formed by placing in the cavity in one mold member between the curved wall 13 and the inner wall of the mold cavity a quantity of rubber and then forcing the two members, the former and the molds together until they engage each other. The peculiar formation of the walls 13 and 14 of the former is such that when the parts are assembled the angle 25 between the walls 13 and 14 snugly contacts with the inner wall of the mold cavity 8 so as to close the space between them. When the mold and former have been brought into operative position, heat is applied to the mold member 2 usually by means of heating the platen 1 and a stream of cold water is forced through the interior of the former 12 by means of the ducts 18 and 19 so as to constantly keep the outer face of the former cool while heating the inner face of the mold section the effect of which in connection with the action of pressure forces the rubber intended to form the half tread member outwardly into the non-skid forming projections and depressions and impart to a certain extent a partial cure to the tread strip, sufficient at least to cause the rubber of the tread to adhere to the mold member at the same time the water chills the wall 13 of the former which prevents adherence of the inner face of the tread with outer face of the wall 13. After one-half of the tread is sufficiently formed to enable it to retain its shape the former 12 is removed and applied to the second mold member with the rubber placed therein and the operation is repeated. The former is then removed from the second mold section and the fabric carcass and core are placed between the two members 3 and 4 and the mold placed in a vulcanizing press and forced together in the usual manner. This operation brings the two wider central portions of the tread strips into contact and during the heat of vulcanization the two separate strips unite and form an integral tread strip. During vulcanization air under pressure is introduced through the inflating tube 23 and the air bag 22 blown up forcing the fabric carcass outwardly against the inner face of the tread strip and causes it to adhere thereto, the effect being to not only stretch out wrinkles but to even up the texture of the carcass and cause its perfect adherence to the tread. It is well known that in use tires are inflated from the interior and in the common method of manufacturing tires during the vulcanization thereof the pressure is applied from the outside, consequently when the tire is put in use it has a tendency to distort under internal pressure whereas if the pressure had been applied to the interior during vulcanization the tire would have been fashioned into the shape which it assumes in use and stretched in the direction and in the manner in which it is stretched during its use. After the vulcanizing operation the air bag is deflated, the mold members separated, the tire removed from the mold and the core removed from the carcass and is ready for use.

I claim,

1. That improvement of making pneumatic tire casings which consists in placing a strip of tread stock in each of two mold sections, subjecting each strip separately while in its respective mold section to the action of a former, clamping said members together about a fabric carcass containing a core, expanding said core and carcass to cause said carcass to adhere to said tread strips and said tread strips to unite the latter together in the presence of a vulcanizing heat.

2. That improvement of making pneumatic tire casings which consists in placing a strip of tread stock in each of two mold sections subjecting each strip separately while in its respective member to the action of a former, to force each tread strip against the interior of the tread portion of its mold member, clamping said mold members together about a fabric carcass containing a core, expanding said carcass by means of said core in the presence of a vulcanizing heat.

3. That improvement of making pneumatic tire casings which consists in placing a strip of tread stock in each of two mold sections subjecting each strip separately while in its respective member to the action of a former, simultaneously heating said mold member and cooling said former, clamping said members about a fabric carcass containing a core, expanding said core about said carcass to cause said carcass to adhere to said tread strips in the presence of a vulcanizing heat.

4. That improvement of making pneumatic tire casings which consists in placing a strip of tread stock in each of two mold sections subjecting each strip separately while in its respective member to the action of a former, simultaneously heating said mold member and introducing a cooling fluid to the interior of said former, then clamping said mold members together about a fabric carcass containing a core, expanding said core to cause said carcass to adhere to said tread strips in the presence of a vulcanizing heat.

5. That improvement of making pneumatic tire casings which consists in placing a strip of tread stock in each of two mold sections, subjecting each strip separately in its respective mold member to the action of a former for forcing each strip against the interior tread face of its mold member, clamping said mold members together about a fabric carcass, positioning a forming core containing a peripheral shallow groove in which is an expansible air bag within said carcass, expanding said air bag to cause said carcass to unite with said tread strips during the vulcanizing operation.

6. That improvement of making pneumatic tire casings which consists in forming a tread by fashioning one-half thereof in each of two mold members by means of a former, clamping said mold members about a fabric carcass containing an expansible core and then vulcanizing said carcass and tread.

7. That improvement of making pneumatic tire casings which consists in forming a tread by fashioning one-half thereof in each of two mold members by means of a former, simultaneously cooling the former during the fashioning operation, then clamping said members together about a fabric carcass containing an expansible core, and vulcanizing the carcass and tire simultaneously.

In testimony whereof I have hereunto set my hand in presence of two subscribing witnesses.

ELNO H. TRUMP.

Witnesses:
H. R. Ewing,
W. D. Young.